UNITED STATES PATENT OFFICE.

WILLIAM G. WEY, OF BARBERTON, OHIO, ASSIGNOR TO THE DIAMOND MATCH COMPANY, OF CHICAGO, ILLINOIS, A CORPORATION OF ILLINOIS.

PROCESS OF TREATING MATCH-SPLINTS.

1,098,700.  
No Drawing.

Specification of Letters Patent.  Patented June 2, 1914.

Application filed May 29, 1913.  Serial No. 770,632.

*To all whom it may concern:*

Be it known that I, WILLIAM G. WEY, a citizen of the United States, and resident of Barberton, in the county of Summit and State of Ohio, have invented certain new and useful Improvements in Processes of Treating Match-Splints, of which the following is a specification.

The object of this invention is to provide a simple, economical and efficient process whereby flaming and non-glowing properties are imparted to match-splints; and to that end I impregnate the splints with a solution of white or yellow phosphorus in an unctuous inflammable material, preferably melted paraffin wax.

In carrying out my invention in a simple and economical manner I prepare a bath of melted paraffin wax and dissolve therein and mix therewith sufficient phosphorus to impart the requisite non-glowing property to the splints which are dipped into and impregnated with the solution. For example, one hundred parts, by weight, of paraffin (125° F. crude scale wax) is melted and heated to a temperature of about 175° F., and one part, by weight, of phosphorus (wet) is dried and dropped into the melted paraffin. The phosphorus at once melts, and, upon stirring, the phosphorus mixes with the melted paraffin. The liquid mixture is heated to about 250° F., and the match splints are dipped in the usual way. The splints thus treated burn freely when ignited owing to the presence of the paraffin therein, and yet when the flame is extinguished there is no after-glow for the reason that the splints are impregnated with the oxy-acids of phosphorus resulting from the oxidization of the phosphorus which was in solution in the paraffin bath.

I claim—

1. The process of treating match splints to impart flaming and non-glowing properties thereto, which consists in subjecting the splints to a solution of phosphorus in an unctuous inflammable substance.

2. The process of treating match splints to impart flaming and non-glowing properties thereto, which consists in subjecting the splints to a solution of phosphorus in melted paraffin.

3. The process of treating match splints to impart flaming and non-glowing properties thereto, which consists in melting paraffin wax, heating the same to a temperature of about 175° F., dissolving phosphorus therein, heating the solution to about 250° F., and then dipping the splints in the solution.

Signed at Barberton, in the county of Summit and State of Ohio, this 23rd day of May A. D. 1913.

WILLIAM G. WEY.

Witnesses:
H. JOHNSTON,
SABINA PARKS.